3,091,404
Patented May 28, 1963

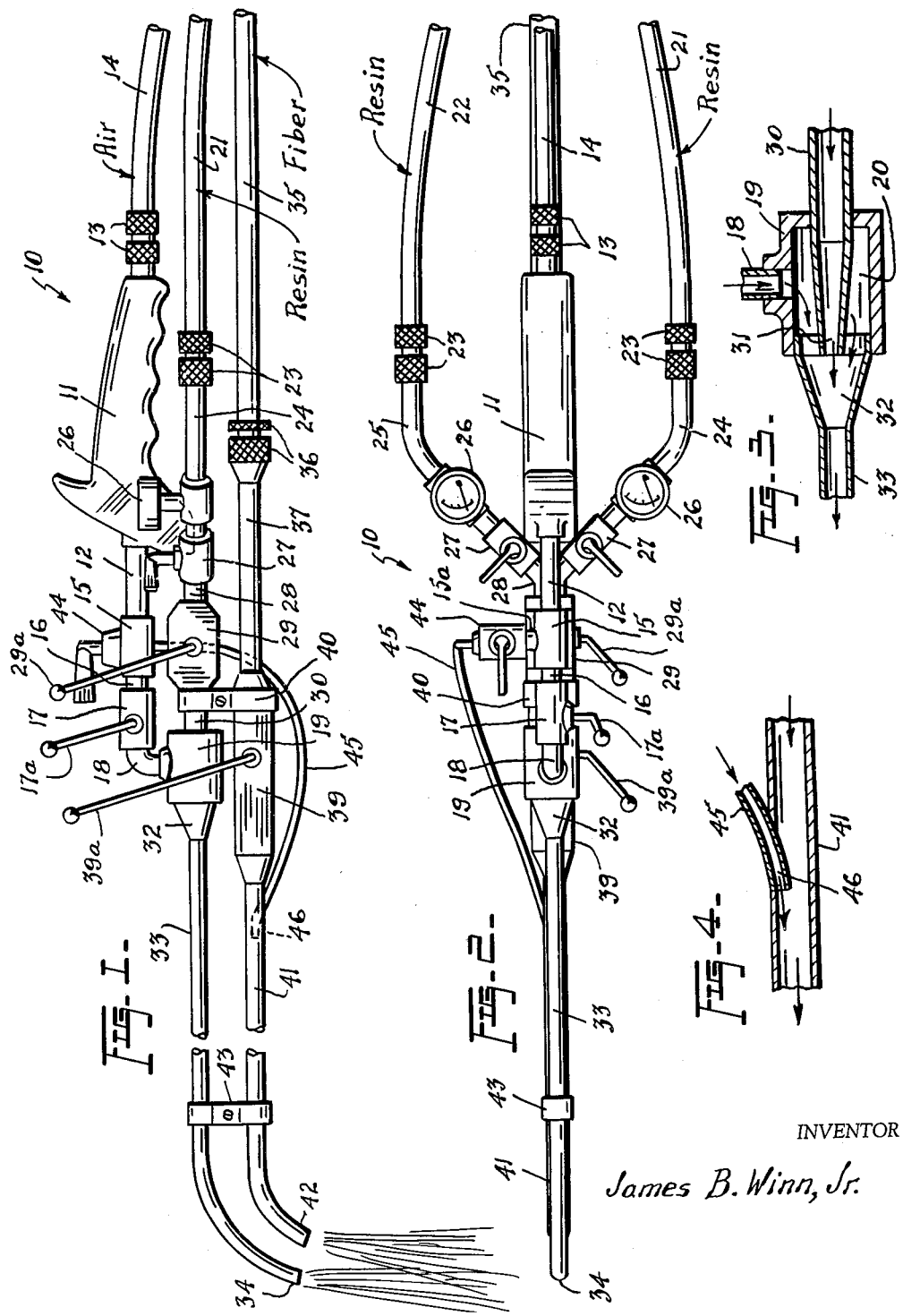

3,091,404
SPRAY GUNS FOR FORMING REINFORCED PLASTIC STRUCTURES IN SITU
James B. Winn, Jr., Wimberley, Tex., assignor to The Archilithic Co., Dallas, Tex., a corporation of Texas
Filed Feb. 7, 1961, Ser. No. 87,629
7 Claims. (Cl. 239—413)

This invention relates to new and useful improvements in apparatus for producing reinforced plastic, resinous, or similar structural bodies, coatings, linings, and the like, and in particular the invention concerns itself with an improved dispensing gun or spray gun used for forming such structural bodies, coatings, linings, et cetera, in situ.

As such, the dispensing gun or spray gun in accordance with the invention is related to and embodies certain improvements in the dispensing and/or spray apparatus disclosed in my co-pending patent application Serial No. 672,723, filed July 18, 1957, now Patent Number 3,034,732, and No. 722,678, filed March 20, 1958, now abandoned, of which this application is a continuation-in-part.

The principal object of the present invention is to provide an improved dispensing gun or spray gun of this type which is capable of operating in a highly efficient manner and which is adapted to handle two different types of resin for mixing with reinforcing fiber during the spraying operation, the arrangement of the gun being such that the two types of resin are thoroughly and homogenously mixed during their passage through the gun, thus avoiding imperfections which usually arise when two separate spray guns are used jointly.

Some of the important features of the present invention reside in a particular organization of parts whereby the gun as a whole may be easily and conveniently manipulated; whereby the flow of the two resins and reinforcing fiber through the gun may be individually controlled so that the same are mixed and dispensed in various desired proportions; and whereby the gun, after use, may be quickly and easily cleaned without disassembly.

Some of the other advantages of the invention reside in its simple construction, efficient operation, convenient portability, easy replacement of parts when necessary, and in its adaptability to economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view of the dispensing gun or spray gun in accordance with the present invention;

FIGURE 2 is a top plan view thereof;

FIGURE 3 is an enlarged, fragmentary longitudinal sectional view of the resin jet chamber; and FIGURE 4 is an enlarged, fragmentary longitudinal sectional view showing the connection of a compressed air line to the resin spray tube.

Referring now to the accompanying drawings in detail, the dispensing gun or spray gun in accordance with the present invention is designated generally by the reference numeral 10 and, as such, is intended to be handled and manipulated as a whole to discharge a mixture of two different resins, or the like, and reinforcing fiber for forming various structural bodies, coatings, linings, et cetera, in situ. For this purpose, the gun is provided with a convenient handle or hand grip 11 which is elongated substantially as shown and is mounted on a rigid compressed air pipe 12, extending longitudinally through the handle.

One end, which may be referred to as the rear end of the pipe 12 has separably connected thereto by suitable couplings 13 a flexible compressed air hose 14, while the other or front end of the pipe 12 is connected to a T 15, having a lateral branch 15a. The front end or branch of the T 15 is connected by a short nipple 16 to a compressed air flow regulating and shut-off valve 17 of a suitable conventional type, having a convenient actuating handle 17a. The valve 17, in turn, is connected by an elbow 18 to a resin jet housing 19 having a chamber 20 therein, the elbow 18 communicating with the housing at one side of the chamber, as is best shown in FIGURE 3.

Two different kinds of plastic, resin, or the like, are delivered to the gun through two separate flexible hoses 21, 22 which are separably connected by suitable couplings 23 to rigid pipes 24, 25, respectively, these pipes being disposed in a common plane below the compressed air pipe 12 and at opposite sides of the latter, as is best apparent from FIGURE 2. Each of the pipes 24, 25 is provided with a resin pressure indicating gauge 26 and with a resin flow regulating valve 27, it being apparent that the two valves 27 are individually adjustable and may be pre-set as desired to vary the rate of flow and proportion of mixing of the two resins in the gun.

The two resin pipes 24, 25 are mutually convergent and connected at their forward ends to a Y 28 in which the flow of resins through the two pipes is joined and delivered to a mixed resin flow control and shut-off valve 29 having a suitable actuating handle 29a. The valve 29 is disposed centrally below the aforementioned T 15 and is provided at its front end with a short rigid pipe or nipple 30 which is secured to the housing 19 and enters the chamber 20, terminating at its front end in a tapered portion or jet 31.

The resin mixture delivered through the jet 31 is propelled by compressed air delivered into the chamber 20 through the elbow 18 into a funnel-shaped entrance portion 32 of a rigid resin spray tube 33 which extends forwardly from the gun and has a downturned outlet or discharge nozzle 34 at its front end.

Reinforcing fiber is delivered to the gun through a flexible hose 35, separably connected by suitable couplings 36 to a rigid pipe 37 which is disposed longitudinally centrally under the valve 29 and is connected at its front end to a throttle valve 39, equipped with a control handle 39a. The valve 39 preferably is similar in construction to the valve disclosed in FIGS. 3 and 4 of my aforementioned patent application Serial No. 722,-678, and is used not only for regulating the rate of flow of fiber through the pipe 37, but also for cutting off the fiber filaments when the valve is shut off.

The valve 39 is supported in the structure of the gun by a suitable clamp 40 which embraces and depends from the nipple 30, and the front end of the valve 39 communicates with a fiber discharge pipe or tube 41 having a downturned outlet or nozzle 42 disposed adjacent the resin outlet nozzle 34, as will be clearly apparent.

The two tubes 33, 41 are braced together by a suitable clamp 43 and it will be noted from the foregoing that the various parts are connected together in such manner that the entire gun may be easily and conveniently handled as a unit.

The aforementioned lateral branch 15a of the T 15 is provided with a compressed air flow regulating and shut-off valve 44 which, in turn, has connected thereto a compressed air line 45. The line 45 extends downwardly and forwardly along one side of the gun and its front end terminates in an outlet or jet 46, discharging into the fiber tube 41 at a point between the valve 39 and the nozzle 42.

When the device is placed in use, the valves 27 are adjusted so as to regulate the flow of the two different kinds of resin in the pipes 24, 25 so that they are mixed in the desired proportions in the mixing Y 28, and the resultant mixture then passes through the valve 29 into the housing 19, being discharged by the jet 31 into the resin tube 33 by pressure of air entering the chamber 20 through the elbow 18. This air pressure is effectively controlled by the valve 17, while the valve 29 is used to control the rate of mixed resin flow in desired proportions to the flow of fiber through the pipe 37 and tube 41, such proportions also being controllable by setting of the throttle valve 39. The flow of compressed air through the line 45, as regulated by the valve 44, enters the fiber tube 41 to assist in fluffing the fiber as well as to clear the tube 41 when the valve 39 is closed. The fiber itself is propelled through the gun by air pressure existing in a pressurized fiber container, as disclosed in my application Serial No. 722,678. After use, the gun may be readily cleaned by simply blowing a suitable thinner through the various pipes, this being effected without the necessity of disassembling the apparatus.

It may be noted that promoted resin and catalyzed resin may be passed through and mixed by the gun for discharge in conjunction with the reinforcing fiber, although the use of the invention is by no means limited to these materials and any suitable resins, plastics, cementitious substances, and the like, may be employed.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. A spray gun for use in forming fiber reinforced plastic structures in situ, said gun being a portable and bodily manipulable entity and comprising in combination a pair of conduits for conveying two different kinds of plastic material, a junction member connecting said conduits together whereby to mix the two different kinds of plastic material together, a mixed plastic material conveying pipe extending from said junction member and terminating in an inwardly tapered jet, a housing enclosing said pipe and providing a chamber around said jet, a mixed plastic material delivery tube extending from said housing and terminating in a discharge nozzle, and means for delivering compressed air into said chamber for discharging mixed plastic material through said delivery tube.

2. The device as defined in claim 1 wherein said means for delivering compressed air into said chamber include a compressed air pipe connected to said housing in lateral communication with said chamber.

3. The device as defined in claim 1 together with plastic material flow regulating valves provided on said conduits.

4. The device as defined in claim 1 together with a flow control and shut-off valve provided on said mixed plastic material conveying pipe.

5. A spray gun for forming fiber reinforced plastic structures which comprises:
   (a) a pair of conduits for conveying two different kinds of plastic material,
   (b) a third conduit for conveying fibers,
   (c) a junction member connecting said pair of conduits together,
   (d) means including a nozzle extending from said junction member for conveying mixed plastic material from said junction member,
   (e) means including a nozzle connected to said third conduit,
   (f) structure interconnecting said nozzles to cause intermingling of the streams issuing therefrom and including a control conduit leading to each said nozzle, and
   (g) a source of compressed air connected to said control conduit for delivering compressed air to the mixed plastic to eject the same and to the fiber delivery nozzle for fluffing fibers therein to enhance dispersion thereof in the intermingled stream.

6. The device as defined in claim 5 together with a flow regulating and cut-off valve provided in said fiber delivery conduit.

7. In a spray gun having conduit means for conveying to a mixing chamber constituents of a settable plastic material and a fluid discharge nozzle for ejection, and co-mingling with a continuous reinforcing fiber roving, the combination which comprises:
   (a) a pressurized fiber source,
   (b) a fiber delivery tube connected to said source,
   (c) a fiber discharge nozzle connected to said fiber delivery tube positioned to eject fibers into the stream leading from said fluid discharge nozzle,
   (d) a fiber control valve adjacent said fiber discharge nozzle, and
   (e) an air channel leading into said nozzle between the nozzle and said valve for fluffing the roving of fibers to enhance the dispersion thereof upon ejection from said fiber discharge nozzle into the stream from said fluid discharge nozzle.

References Cited in the file of this patent
UNITED STATES PATENTS

| | | |
|---|---|---|
| 1,616,685 | Frazier et al. | Feb. 8, 1927 |
| 1,881,345 | Beatty et al. | Oct. 4, 1932 |
| 2,143,817 | Longdin et al. | Jan. 10, 1939 |
| 2,532,554 | Joeck | Dec. 5, 1950 |
| 2,566,392 | Wilkins et al. | Sept. 4, 1951 |
| 2,764,455 | Seibel | Sept. 25, 1956 |
| 2,931,580 | Johnson | Apr. 5, 1960 |

FOREIGN PATENTS

| | | |
|---|---|---|
| 122,807 | Switzerland | Oct. 1, 1927 |